Patented Aug. 25, 1953

2,650,257

UNITED STATES PATENT OFFICE 2,650,257

LEAD-ACID ELECTRIC STORAGE BATTERY AND PROCESS OF PRODUCING SAME

Edward L. Jolley, Salt Lake City, Utah, assignor to Clarite Battery, Inc., a corporation of Utah No Drawing. Application November 3, 1949, Serial No. 125,394

8 Claims. (Cl. 136—34)

This invention relates to electric storage batteries of the lead-acid type, and to processes employed in their manufacture.

A conventional lead-acid electric storage battery is made up of positive and negative lead plates spaced apart within a suitable container by separator plates, which are usually wood. The container is filled with an electrolyte in which the plate structure is immersed, the electrolyte being customarily a dilute solution of sulfuric acid and distilled water. Migration and deposition of the sulfate and hydrogen ions of the electrolyte occur during electrical charge and discharge of the battery.

In the preparation of such storage battery for use after physically assembling the component structural parts thereof within the casing, it is common practice to follow a so-called "forming" procedure for conditioning the lead plates. In accordance with such procedure, the electrolyte initially introduced has a specific gravity less than is necessary for normal operation. The battery as so constituted is charged and discharged, whereupon the electrolyte is dumped, and fresh electrolyte having the requisite higher specific gravity is introduced. The battery is then recharged for use.

My invention involves the introduction into the battery casing for this forming stage of the battery, of a special electrolyte prepared from a solution derived by leaching a particular type of impregnated shale rock occurring naturally in a certain geologic formation located in Emery County in the State of Utah, and, further, the conditioning of the plates of the battery while such plates are immersed in this special electrolyte.

The leach solution has a high sulphate content, which is apparently in such condition as to advantageously augment the electrolytic characteristics of sulfuric acid. I have found that a mixture of this solution with commercial concentrated sulfuric acid in suitable proportions, hereinafter specified, has a superior conditioning or "forming" action on the lead plates when used at the relatively low specific gravity customary for the usual pure sulfuric acid electrolyte, and, contrary to standard practice, may be, and preferably is, retained in the battery as the permanent electrolyte after the "forming" operation is completed. As so retained in the battery at such relatively low specific gravity, the so-called "forming" electrolyte imparts superior operating characteristics and longer life. Nevertheless, whether such "forming" electrolyte be retained or not, I have found that the novel "forming" process produces a battery whose electrode and separator plates hold up longer in use and make for better operative characteristics.

While the reasons for the superior results attained by my method, and for the fact that a battery in which the "forming" electrolyte is retained maintains an operative electrical charge even though such electrolyte is of relatively low specific gravity, are not entirely clear, I believe they are due at least in part to the high sulfate ion concentration resulting from the mixture of the special leach solution with sulfuric acid. A requisite high sulfate ion concentration for satisfactory operation is apparently thereby attained without the accompanying excessive caustic action of the conventional electrolyte. Furthermore, the sulfate ions released from the leach solution to augment those released from the sulfuric acid are apparently accompanied by the release of metallic ions which, by deposition within the battery, contribute to the superior results achieved.

Principal objects of the invention are, therefore:

To provide a lead-acid electric storage battery having a considerably longer operative life than conventional batteries of the type, and one which will retain a given charge over a considerably longer period.

To provide such a battery which may be stored in a charged though inactive condition for longer periods of time without losing its charge than can ordinary batteries of the type.

To provide such a battery in which the permanent electrolyte has a lower specific gravity than is ordinarily possible, in which internal heating is considerably reduced, and in which ion migration through the casing is reduced to a minimum, if not entirely eliminated.

To provide a process for producing such a battery.

To provide a process of manufacture which will contribute materially to extending the operating life of a lead-acid electric storage battery.

To provide a novel method of forming a lead-acid electric storage battery, whereby dumping of the electrolyte at the so-called "forming" stage is rendered unnecessary, thereby effecting substantial economies in the manufacture.

In accordance with my process, the structural components of the battery are assembled in the customary manner up to the stage of so-called "forming." Thereupon, the special electrolyte is introduced, and the battery "formed" by electrically charging the assembly, followed by discharging to substantially the "dead" condition.

The resulting electric storage battery may be and preferably is immediately recharged for use, though occasionally special considerations, such as the necessity of long-distance transportation to the point of sale or use, will make it desirable to dump the "forming" electrolyte and replace it with fresh electrolyte later at the new location. In such instances, it is desirable that the battery be refilled with a similar low specific gravity electrolyte.

Further objects and features of the invention will become apparent from the following detailed description of the presently preferred specific embodiments thereof.

The leach solution employed in the preparation of the special electrolyte which I utilize in connection with the method and product of the invention, is derived by suitably processing a particular variety of shale indigenous to Emery County of the State of Utah. Such shale is commonly known as "Bluegate" in its native locality, and is an impregnated portion of the Mancos shales lying immediately above the Ferron sands.

For best results I utilize only the highly impregnated or richer portions of this shale, such high grade portions being normally distinguishable from the lower grades by a pronounced darker color and the presence of innumerable shiny particles.

I have found that water heated to approximately a temperature of between 185 and 190 degrees Fahrenheit, with the addition of about one-half of one per cent sulfuric acid by volume, provides the most effective leaching agency, the shale being subjected to the leaching action thereof for approximately five minutes. The sulfuric acid is not essential, but aids in the leaching action and prevents the formation of an organic scum on the surface of the derived leach solution when stored for any length of time prior to use.

Leach solutions derived in this manner have been found to carry a high sulfate radical content, approximately 18 grams per liter being typical. Besides this, various metals have been found to be present in significant amounts, notably aluminum, magnesium, iron, manganese, zinc, nickel, cobalt, and copper to the extent of approximately 4 grams per liter all told.

Chemical analysis of a particular leach solution yielded the following results:

| Radicles: | Grams per liter |
|---|---|
| Aluminum | 2.3600 |
| Magnesium | .9900 |
| Calcium | .7050 |
| Iron | .1350 |
| Manganese | .0730 |
| Zinc | .0430 |
| Nickel | .0300 |
| Cobalt | .0012 |
| Copper | .0004 |
| Barium | trace |
| Strontium | trace |
| Potassium | trace |
| Chromium | trace |
| Titanium | trace |
| Sulfate ($SO_4$) | 18.4300 |
| Chloride (Cl) | .2140 |
| Phosphate ($PO_4$) | .0120 |
| Nitrate ($NO_3$) | .0280 |
| Borate ($BO_2$) | .0430 |
| Sodium | .3550 |
| Silicate ($SiO_3$) | .2390 |

In preparing the electrolyte, I equalize various extractions of this leach solution by intermixing, and utilize the resultant solution at a Baumé reading of from 0.1 to 4.0, a reading of 1.0 being normally preferred. With such equalized solution, I mix from 10 to 35 per cent by volume of commercial concentrated sulphuric acid to obtain a specific gravity of approximately 1.175.

The electrolyte so prepared is introduced into the battery casing following the assembly, in customary manner, of the several components of the battery structure, which include positive and negative lead plates, prepared in the usual manner, and separator plates, commonly of wood.

Thereupon, the assembly is electrically charged by the application, in customary manner, of an external source of electric current. Following this charging operation, the battery is discharged to a normally "dead" condition. It is then ready for recharging and use, utilizing this "forming" electrolyte of relatively low specific gravity as the permanent electrolyte.

In the conventional "forming" stage of lead-acid electric storage battery manufacture, a pure sulfuric acid electrolyte of approximately 1.175 specific gravity is employed. Following such "forming" stage, however, this relatively low specific gravity electrolyte is dumped, and replaced with a pure sulfuric acid electrolyte of relatively high specific gravity, namely, one having a specific gravity of approximately 1.285.

Thus, it is seen that the invention actually permits the elimination of a heretofore necessary stage in the preparation of a lead-acid electric storage battery for use.

Whereas this invention is described with respect to a certain presently preferred specific embodiment thereof, it should be understood that various changes may be made therein and various other forms may be utilized on the basis of the teachings hereof, by those skilled in the art, without departing from the protective scope of the following claims.

I claim:

1. In the manufacture of a lead-acid type of electric storage battery, a process of finally forming the lead plates thereof following installation, comprising the steps of introducing into the assembled battery structure an electrolyte made up of a mixture of commercial concentrated sulfuric acid and an aqueous leach solution derived from Bluegate shale and carrying a high sulfate radical content of natural origin attributable entirely to the said shale, said electrolyte having a specific gravity of approximately 1.175; electrically charging the assembly; and discharging said assembly to a substantially dead condition.

2. The process recited in claim 1, wherein the concentrated sulfuric acid constitutes from 10 to 35 per cent by volume of the total electrolyte.

3. The process recited in claim 2, wherein the leach solution is derived by subjecting high-grade Bluegate shale to the leaching action of water at approximately from 185 to 190 degrees Fahrenheit for a period of about 5 minutes.

4. The process recited in claim 3, wherein the leach solution contains approximately one-half of one per cent by volume of commercial concentrated sulfuric acid.

5. The process recited in claim 1, wherein is added the step of electrically recharging the assembly for use.

6. A lead-acid type of electric storage battery prepared for use, comprising an electrolyte of approximately 1.175 specific gravity made up of a mixture of commercial concentrated sulfuric acid and an aqueous leach solution derived from Bluegate shale and carrying a high sulfate radical content of natural origin attributable entirely to the said shale.

7. An electrolyte for lead-acid electric storage batteries, consisting of a mixture of commercial concentrated sulfuric acid and an aqueous leach solution derived from Bluegate shale and carrying a high sulfate radical content.

8. The process recited in claim 1, wherein the aqueous leach solution is made up from a mixture of a plurality of leach extractions derived from individual batches of shale.

EDWARD L. JOLLEY.

References Cited in the file of this patent

UNITED STATES PATENTS

| Number | Name | Date |
|---|---|---|
| 396,369 | Roberts | Jan. 15, 1889 |
| 599,315 | Crowdus | Feb. 22, 1898 |
| 1,175,280 | Luthy | Mar. 14, 1916 |
| 1,719,204 | Tefft | July 2, 1929 |
| 2,269,040 | Rublee | Jan. 6, 1942 |
| 2,544,517 | Wheat | Mar. 6, 1951 |

FOREIGN PATENTS

| Number | Country | Date |
|---|---|---|
| 4,311 | Great Britain | of 1887 |
| 5,205 | Great Britain | of 1895 |
| 251 | Great Britain | of 1897 |
| 4,410 | Great Britain | of 1903 |
| 167,568 | Great Britain | Aug. 8, 1921 |

OTHER REFERENCES

Power Plant Engineering, May 1944, pp. 107–108.